E. P. BRADY.
RAKE.
APPLICATION FILED MAY 31, 1910.
1,046,144.
Patented Dec. 3, 1912.
3 SHEETS—SHEET 2.
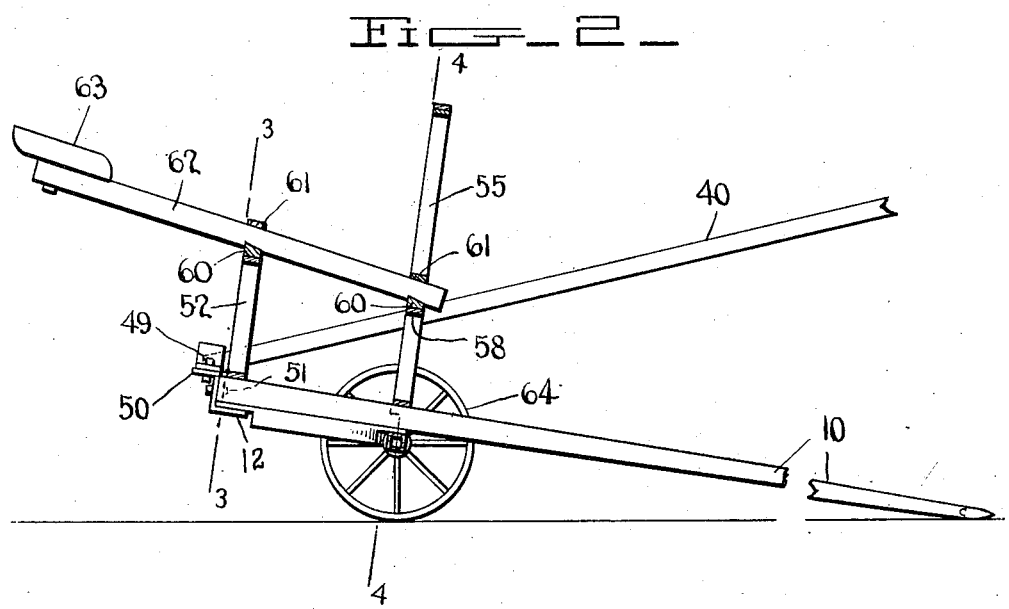
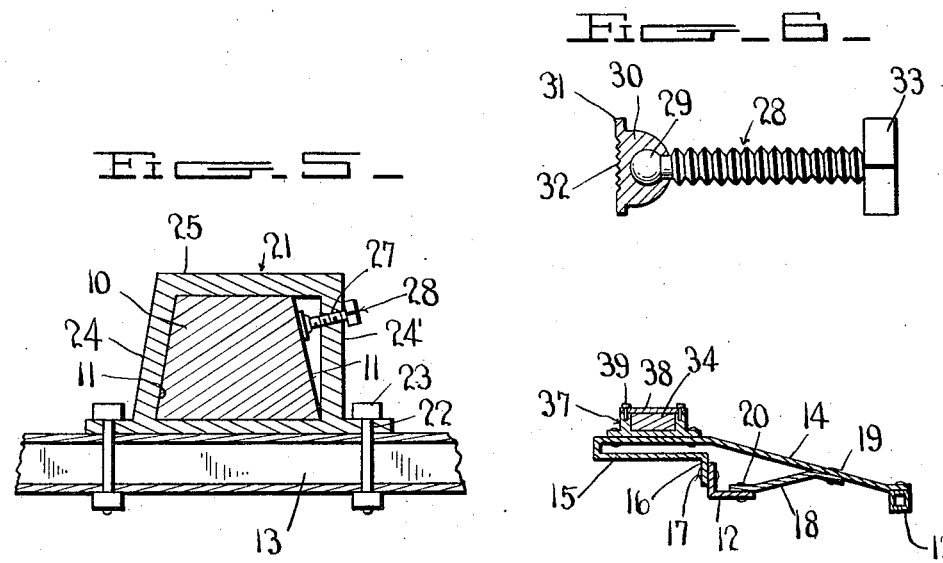
Witnesses
L. B. James
Francis Boyle
Inventor
Edward P. Brady
By
Attorneys

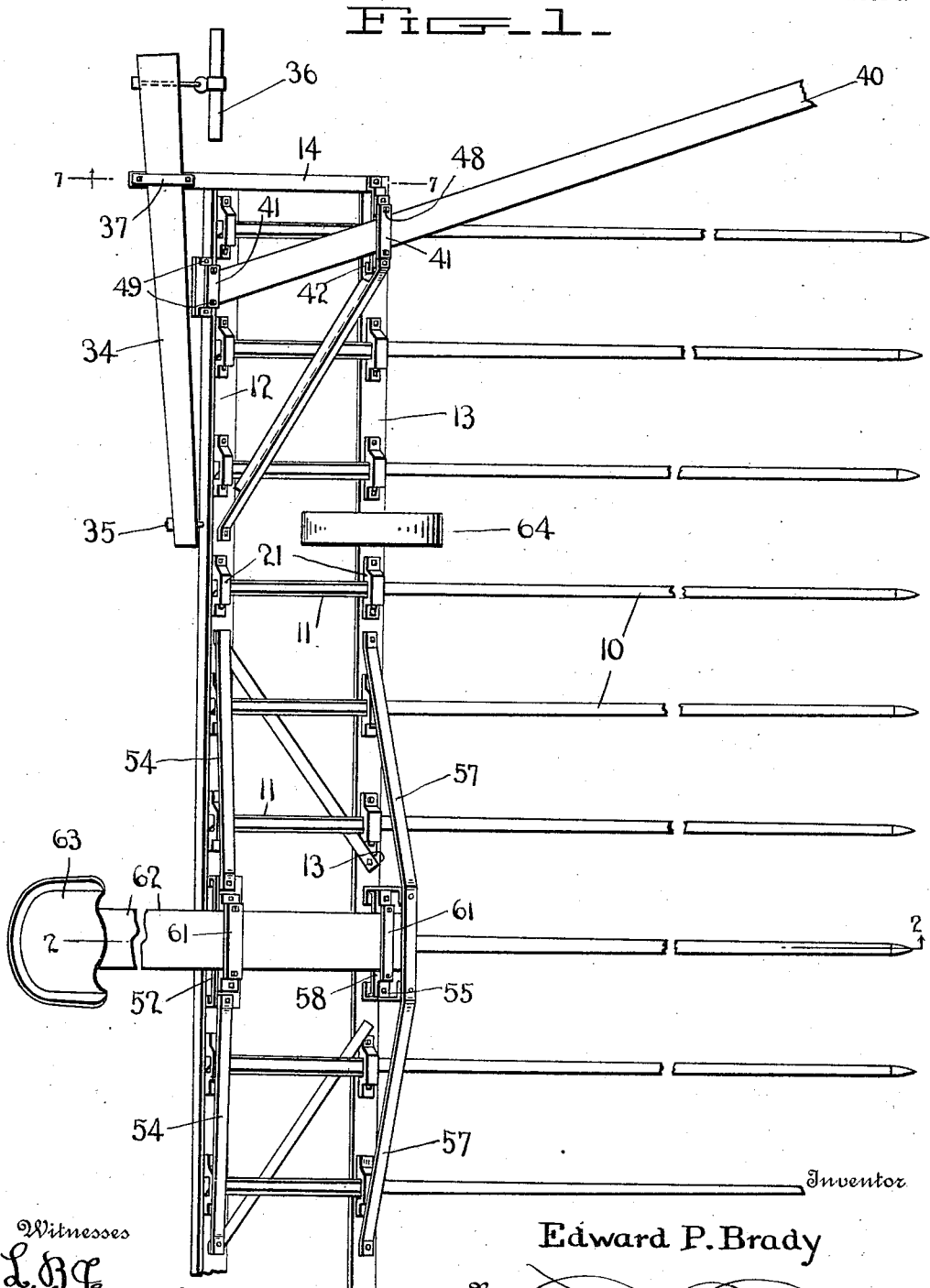

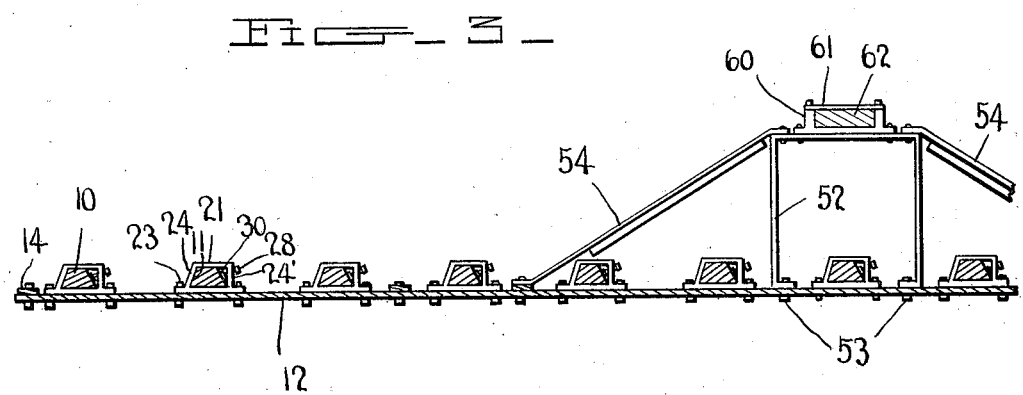
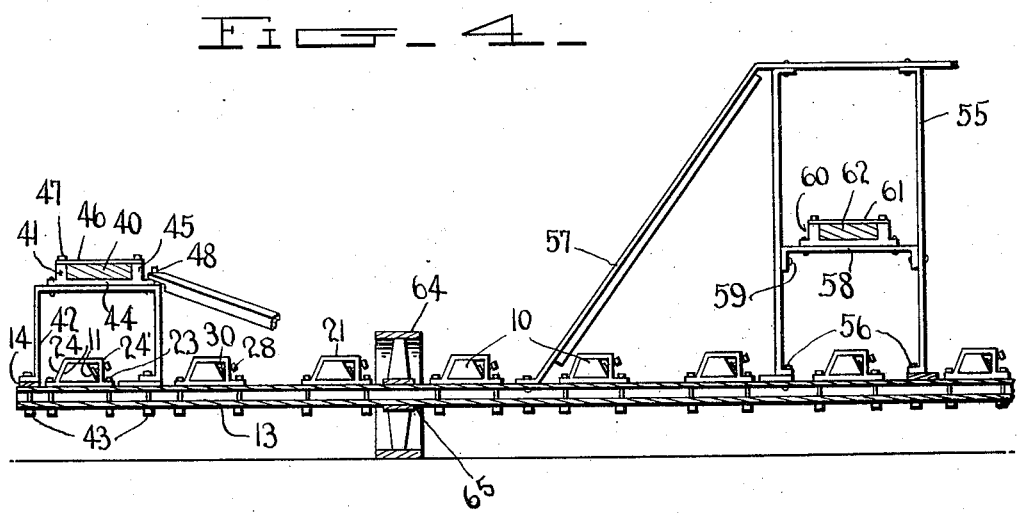

UNITED STATES PATENT OFFICE.

EDWARD P. BRADY, OF PLATTSBURG, MISSOURI.

RAKE.

1,046,144.

Specification of Letters Patent.  Patented Dec. 3, 1912.

Application filed May 31, 1910. Serial No. 564,195.

*To all whom it may concern:*

Be it known that I, EDWARD P. BRADY, a citizen of the United States, residing at Plattsburg, in the county of Clinton, State of Missouri, have invented certain new and useful Improvements in Rakes; and I do hereby declare the following to be a full, clear, and exact description of the invention, such as will enable others skilled in the art to which it appertains to make and use the same.

This invention relates to hay rakes of that general class commonly known as drags, and has for its principal object to provide novel means for detachably securing the drag teeth in position so that a broken tooth may be quickly and easily replaced with a new one, and so that the drag may be quickly disassembled in order to facilitate transportation.

The invention resides in the novel form of securing bracket employed to attain the above end.

With the above ends in view, the invention consists of the novel details of construction and combination of parts hereinafter fully described and claimed, it being understood that various modifications in the minor details of construction may be made within the scope of the appended claim.

In the accompanying drawings forming part of this specification: Figure 1 is a fragmentary plan view of a drag equipped with my improved teeth securing brackets. Fig. 2 is a longtiudinal sectional view taken on the line 2—2, Fig. 1, with parts removed and parts in elevation. Fig. 3 is a cross sectional view taken on the line 3—3, Fig. 2. Fig. 4 is a cross sectional view taken on the line 4—4, Fig. 2. Fig. 5 is an enlarged transverse sectional view through one of the teeth securing brackets showing a tooth therein. Fig. 6 is an enlarged longitudinal sectional view through a set screw. Fig. 7 is a longitudinal section on the line 7—7, Fig. 1.

In the accompanying drawings, the drag teeth are designated in general by the numeral 10 and are herein shown as rectangular in contour and cross section and having their butt ends beveled on both sides as shown at 11. The rear ends of the teeth 10 are connected in the usual manner by a pair of parallel cross bars 12 and 13 the rearmost of which is right angular in cross section and engages the extreme end face and bottom face of each tooth, and the foremost of which is a hollow square in cross section and supports upon its top face the intermediate portions of the teeth. The teeth are removably secured upon these cross bars by novel brackets hereinafter described. The cross bars are connected adjacent their opposite ends by a pair of parallel brace links 14, only one of which is shown in the drawings. The forward end of this link 14 is bolted or otherwise rigidly secured to the top face of the foremost cross bar 13 and the rear end of the link is looped upon itself as shown at 15 to form a seat and the extreme end of this loop directed downwardly as shown at 16 and bolted as shown at 17 to the vertical leg of the right angular rear cross bar 12. A brace strip 18 is provided one end of this brace being bolted as shown at 19 to the link adjacent the foremost cross bar 11 and the opposite end being bolted as shown at 20 to the horizontal leg of the rearmost cross bar 12. This construction rigidly secures the cross bars together so that the teeth are not depended upon in any way to perform this function, as where the teeth are bolted directly to the cross bars and the portions of the teeth intermediate the cross bars perform the function of holding the cross bars spaced. Each tooth is secured to each of the cross bars by means of brackets 21. Each bracket comprises a base plate having bolt openings 22 adjacent its extremities through which and registering openings formed in the cross bars, bolts 23 are passed. Rising from the top face of the base plate adjacent its opposite ends are an inwardly inclined wall 24 and a vertical wall 24′ and the top edges of these walls are connected by an integral top wall 25. It will thus be seen that a socket is formed, the inner side walls of which are non-parallel and the top and bottom walls of which are parallel. The incline of the side walls 24 of the brackets is approximately the same as the incline of the beveled sides 11 of the teeth. A threaded opening 27 extends obliquely through the vertical wall of the bracket and receives a set screw 28 the inner end of which terminates in a knob 29 upon which is mounted a semicircular head 30, the flat face of this head being extended peripherally to form a flange 31 which presents a broad bearing face against the inclined side 11 of the teeth. The working face of the head is roughened as shown at 32 in order to permit of the swiveled head 30 being advanced into snug engagement with the tooth. The outer end of the set screw is provided with the usual angular head 33 for receiving the jaws of an ordinary wrench.
It will be noted that the extreme butt end face of each tooth is in abutting contact with the upright leg of the right angular cross bar 12, this construction causing the cross bar to reinforce the set screws of the bracket when the teeth are accidentally dug into the ground during the advancement of the rake so that neither the teeth nor the teeth securing brackets will be injured. By simply backing out the set screws 28, the teeth may be quickly and easily removed from the cross bars, the cross bars meanwhile retaining their normal spaced relation by virtue of the links 14. The disassembled cross bars and teeth may now be conveniently transported to their destination when the cross bars and teeth may again be quickly assembled by simply inserting the teeth in the brackets and screwing home the set screws.
The draw bar of the drag is designated by the numeral 34 and is shown to be connected to the upright leg of the right angular cross bar by means of a bolt 35 and is equipped at its opposite end with a swingletree 36. These draw bars are two in number, one at each end of the drag, but only one is shown in order to simplify the views. The draw bar 34 is secured to the link 14 by means of a channel bracket 37, this channel bracket having a top plate 38 which spans its legs and engages the top face of the draw bar, the top plate being removably secured to the channel bracket by means of set screws 39 passed downwardly through the ends of the channel plate and into the top faces of the channel bar legs.
The pole of the drag is designated by the numeral 40 and this pole is removably secured in position by means of channel brackets 41. The pole as usual in devices of this kind is inclined upwardly at an angle to the plane of the teeth as may be clearly seen in Fig. 2, and to accomplish this, an inverted U shaped truss 42 is mounted upon the foremost cross bar 13 and is bolted as shown at 43 to the cross bar. The channel brackets 41 are similar to the brackets 37 above described, that is, each comprises a base plate 44 from the top face of which rise standards 45 between which the pole 40 is engaged, and is held therein by means of a top plate 46 the extremity of which is bolted to the standards 45 as shown at 47. The bed plate of the foremost channel bar is bolted as shown at 48 to the inverted U shaped truss and the bed plate of the rearmost standard is bolted as shown at 49 to the horizontal leg 50 of an inverted L shaped shelf, the vertical leg 51 of which is bolted to the inner face of the upright leg of the right angular cross bar 12 as may be clearly seen by referring to Fig. 2. This construction permits of the pole being readily removed when it is desired to dissemble the machine.
In order to permit of the seat being disassembled, I provide the following construction:—Arranged upon the rearmost cross bar 12 is an inverted U shaped truss 52 similar to the truss above described and having its terminals secured to the horizontal leg of the cross bar by means of bolts 53. The truss is braced against displacement by inclined braces 54 one terminal of each brace being bolted to the cross bar of the truss and the opposite terminal being bolted to the horizontal leg of the cross bar. Arranged upon the foremost cross bar 13 is an inverted U shaped truss 55 the lower terminals of which are secured to the cross bar by means of bolts 56. Inclined braces 57 are secured at their opposite ends to the truss and cross bar and anchor the truss against swaying. Arranged between the legs of the truss is a plate 58 the terminals of which are bent downwardly and are rigidly secured to the cross bar by means of bolts 59. This plate is arranged below the horizontal plane of the top of the first described truss 52. Seated upon the truss 52 and shelf 58 are a pair of channel brackets 60 similar to the channel bars already described, the top plates 61 of these channel bars operating to retain an inclined post 62 the upper ends of this post being equipped with an ordinary seat 63. By simply removing the top plate of the channel brackets the seat post may be readily removed from the cross bars when it is desired to disassemble the machine. A pair of supporting wheels 64 is mounted upon suitable bearings 65 fixed to the foremost transverse bar 13. Only one of these wheels is shown in the drawings to simplify the views as above stated.
From the above it will be seen that the pole and seat may be readily disassembled when it is desired to transport the machine from one place to another, and further, that the novel brackets 24 permit of the teeth of the machine being disassembled.
What is claimed is:—
In a rake, a tooth having a butt end of substantially trapezoidal cross section, a securing bracket encircling said butt end and having a base and one side disposed at a right angle to each other, there being a wedge-shaped space existing between the side of said butt end and said bracket side, and a set screw on said bracket side disposed at a right angle to and bearing against said butt end side.

In testimony whereof, I affix my signature, in presence of witnesses.

EDWARD P. BRADY.

Witnesses:
R. H. MUSSER,
T. J. MATTAGHAN,
W. T. HARBISON, Jr.

Copies of this patent may be obtained for five cents each, by addressing the "Commissioner of Patents, Washington, D. C."